United States Patent [19]

Postupack et al.

[11] 4,208,446
[45] Jun. 17, 1980

[54] METHOD FOR FORMING GRADED SHADE BAND ON SUBSTRATE

[75] Inventors: Dennis S. Postupack, Natrona Heights; David A. Allerton, Glenshaw; Richard L. Emmert, New Kensington, all of Pa.

[73] Assignee: PPG Industries, Inc., Pittsburgh, Pa.

[21] Appl. No.: 898,601

[22] Filed: Apr. 21, 1978

[51] Int. Cl.$^2$ ............................................. B05D 1/04
[52] U.S. Cl. .................................. 430/124; 118/624; 118/629; 118/631; 427/27; 427/163; 427/168; 427/282; 427/294
[58] Field of Search ............... 427/14, 27, 30, 31, 427/33, 164, 282, 284, 287, 294, 421, 163, 165, 168; 118/50, 50.1, 624, 627, 629, 630, 631, 621; 65/60 R, 60 B

[56] References Cited

U.S. PATENT DOCUMENTS

| 2,676,114 | 4/1954 | Barkley | 427/282 |
| 4,138,284 | 2/1979 | Postupack | 118/627 |

FOREIGN PATENT DOCUMENTS 1081368 5/1960 Fed. Rep. of Germany .

Primary Examiner—Michael F. Esposito
Assistant Examiner—Stuart D. Frenkel
Attorney, Agent, or Firm—Edward I. Mates

[57] ABSTRACT

Forming a colored shade band on an elongated area of a flexible sheet of interlayer material comprising applying a dye composition by electrostatic spraying against a portion of a surface of a flexible sheet of non-conductive interlayer material such as polyurethane or plasticized polyvinyl butyral. A novel grounded shielding structure of electroconductive material comprises a primary shield located in close proximity to the upper surface of a workpiece to be partially coated. A preferred embodiment comprises primary and secondary shields with an optional manifold between the shields to ensure superior control of a pattern of graded intensity along the transverse dimension of an elongated area to be coated. One or both shields may be heated to avoid the deposit of spray particles that cause optical defects. The workpiece so coated is useful as an interlayer in shaded, bent laminated safety glass windshields.

7 Claims, 12 Drawing Figures

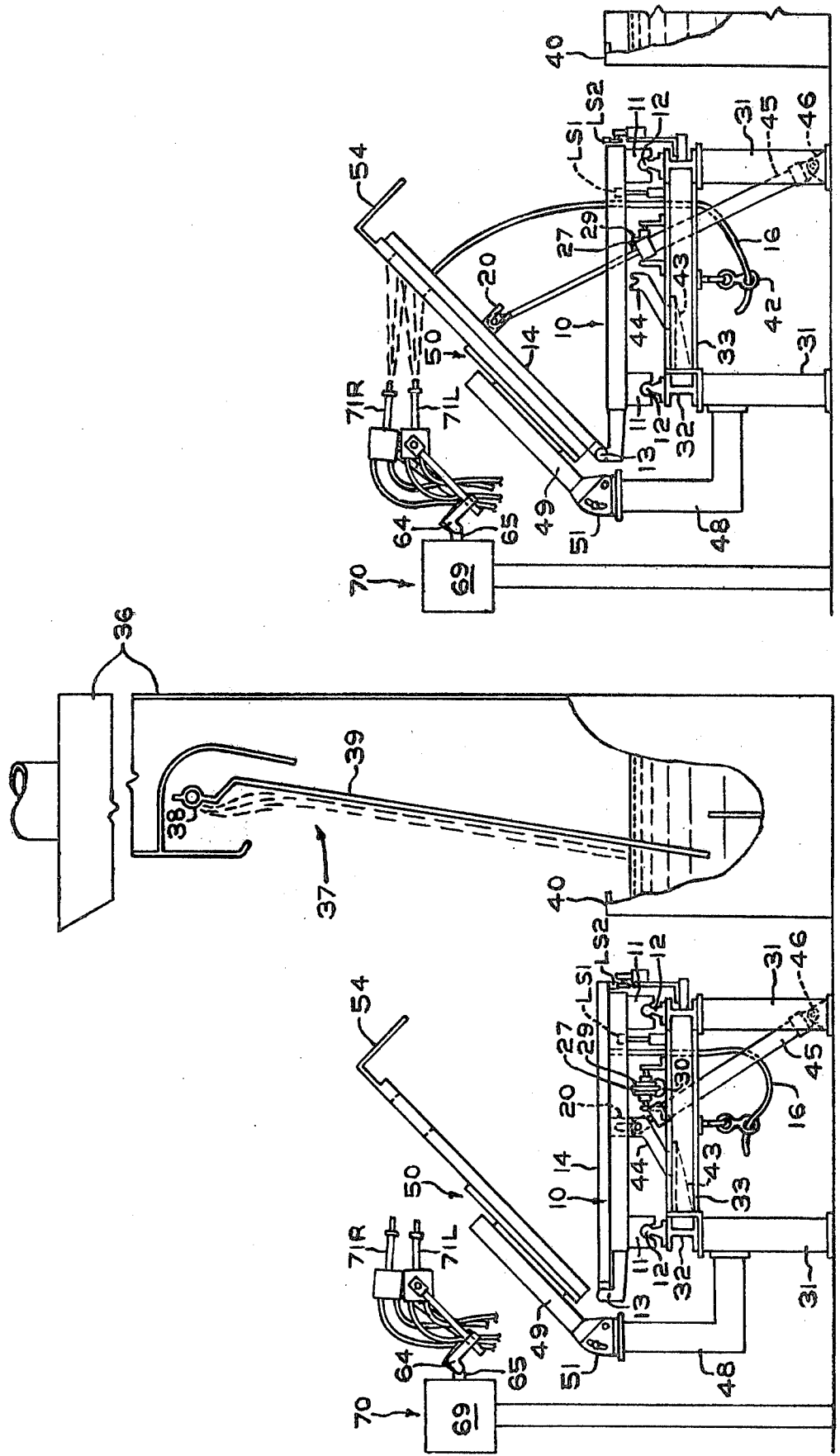

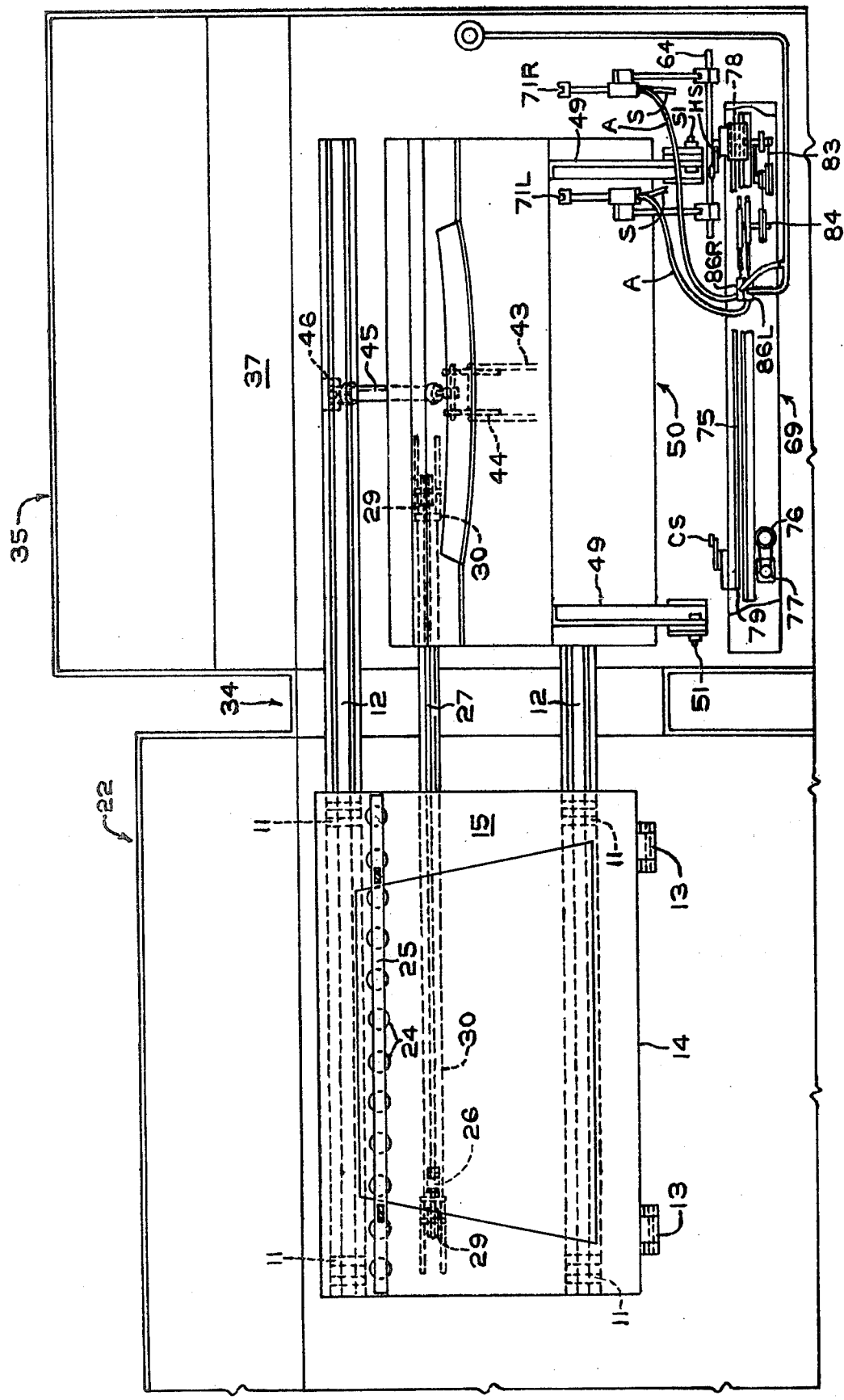

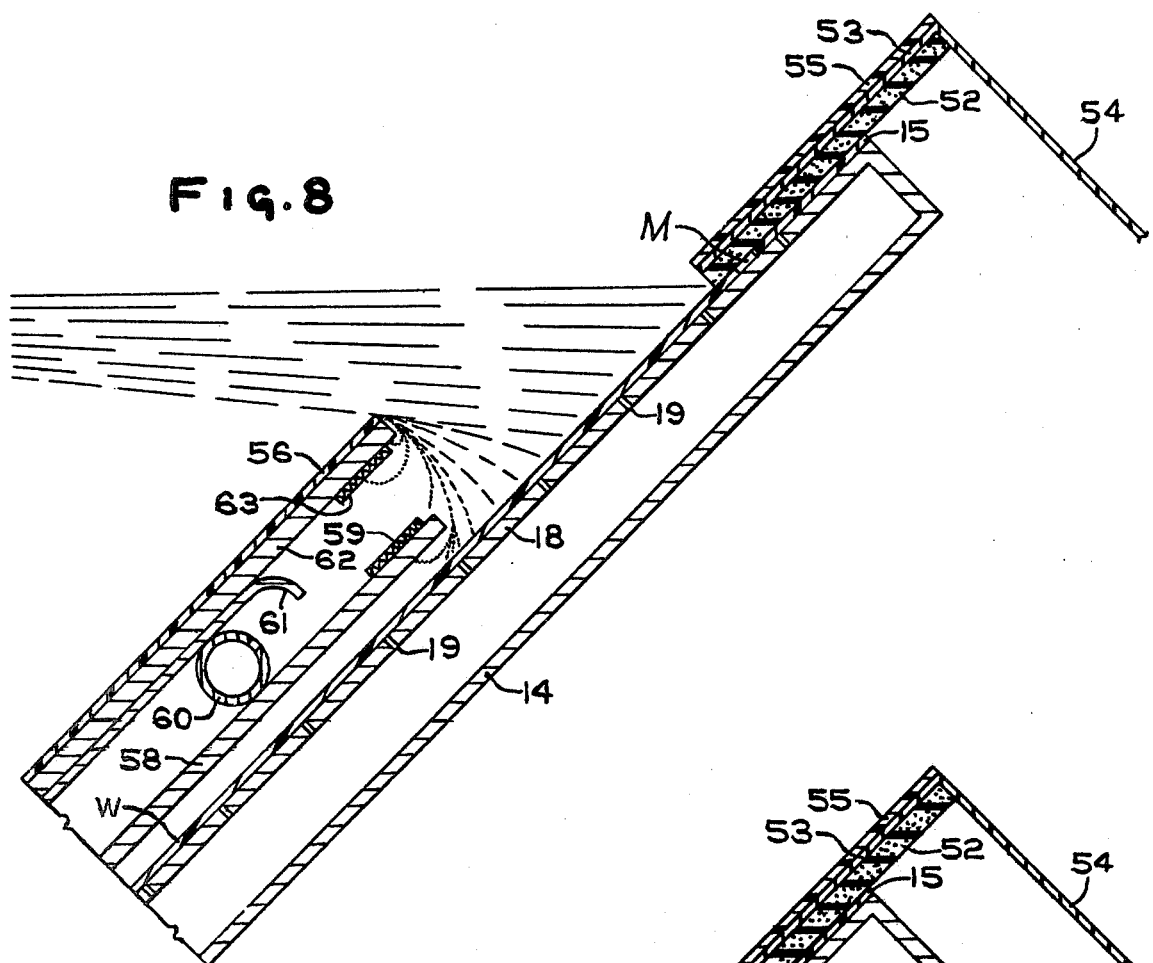
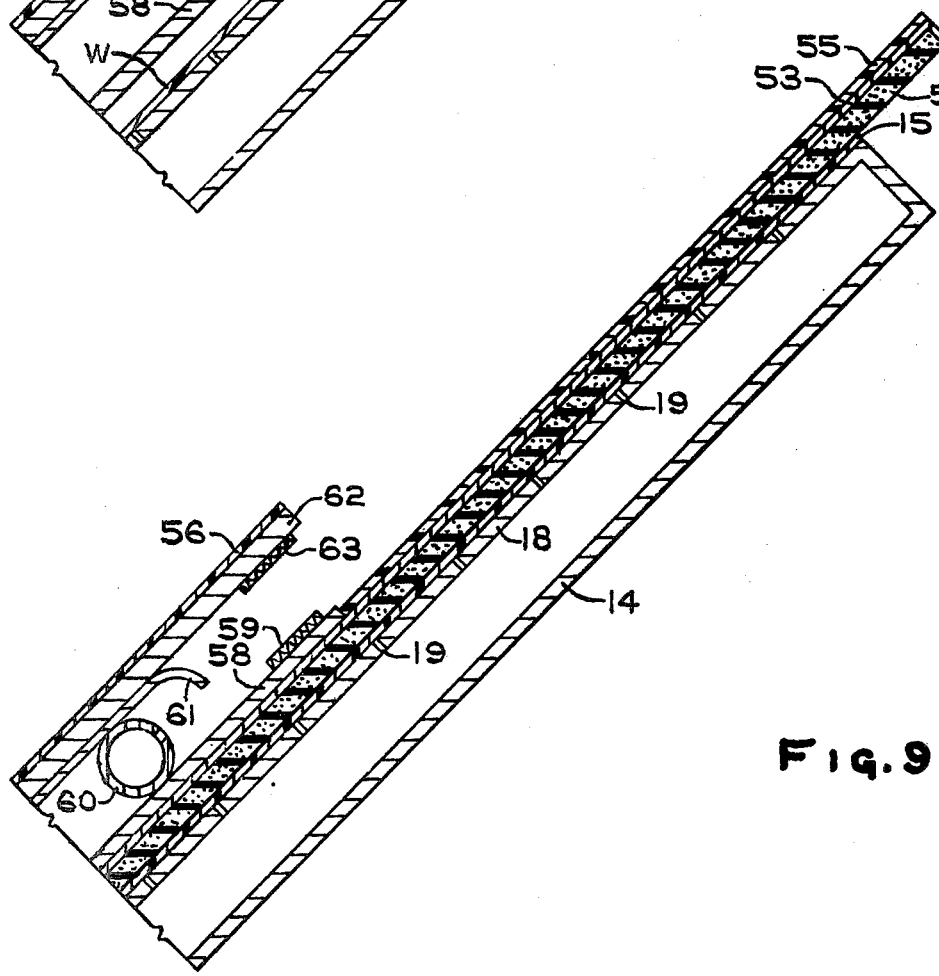

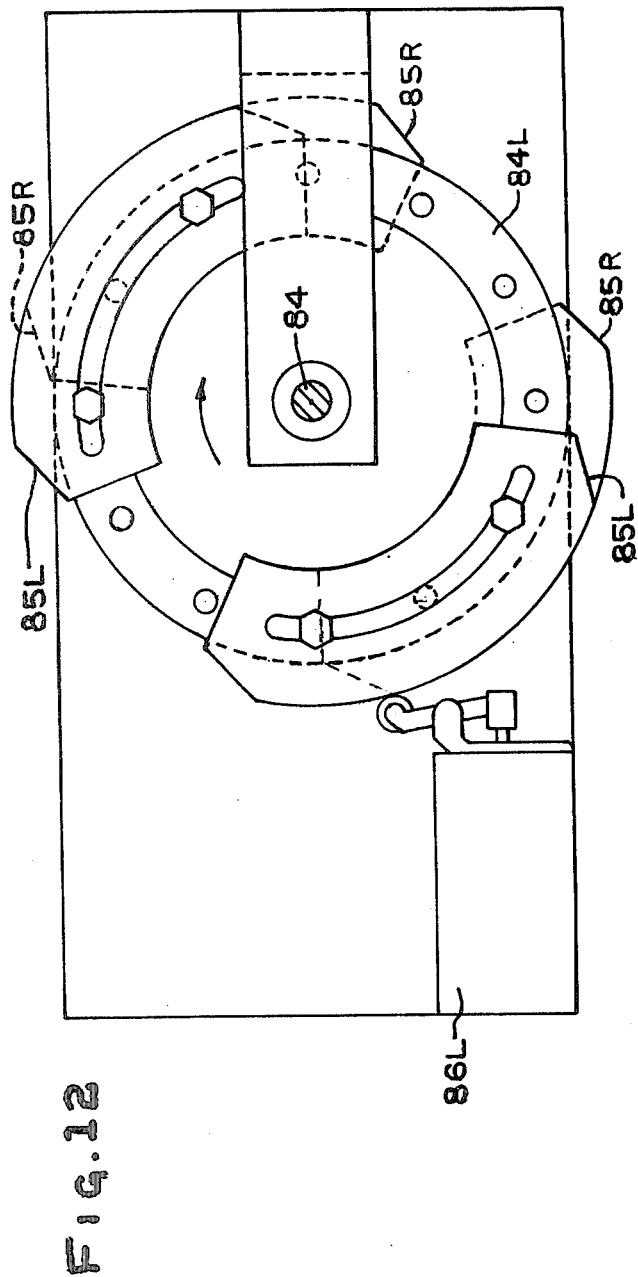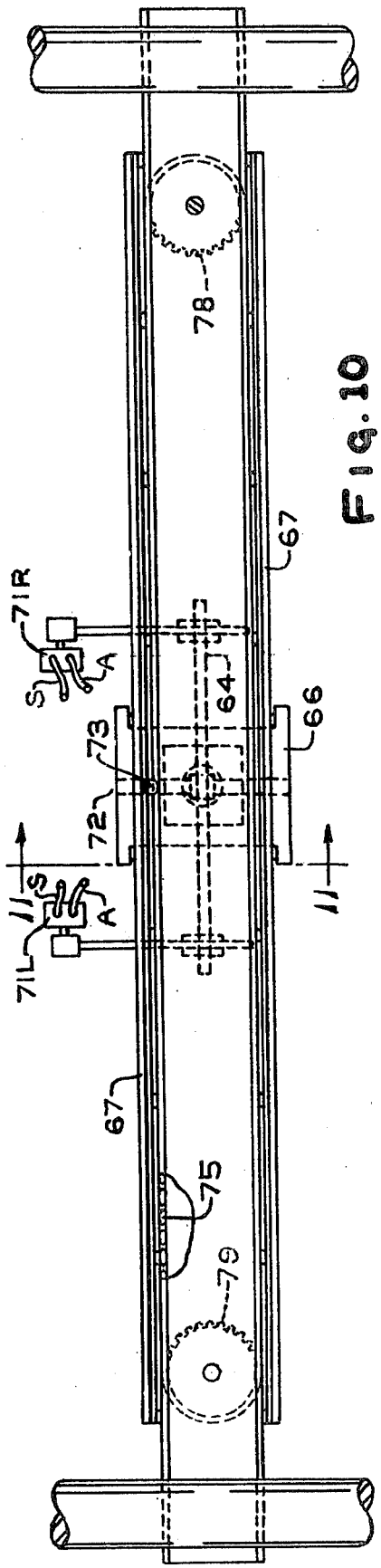

METHOD FOR FORMING GRADED SHADE BAND ON SUBSTRATE

REFERENCE TO RELATED APPLICATIONS

This invention is related to the invention disclosed and claimed in U.S. Application Ser. No. 868,013 To Dennis Postupack, filed on Jan. 9, 1978, now U.S. Pat. No. 4,138,284 for Method of Forming Graded Shade Band on Substrate.

BACKGROUND OF THE INVENTION

1. Field of the Invention

The present invention relates to a method of and apparatus for forming a colored band of graded intensity having a curved cut-off line along one edge thereof and a desired transverse pattern of graded intensity along a longitudinally extending area of a workpiece in the form of a flexible sheet of plastic interlayer material suitable for use as an interlayer in laminated safety glass. The workpiece is preferably coated by electrostatic spraying to insure that very fine droplets of dye composition form a band of color having a desired intensity pattern along its transverse dimension that includes a first coating portion of substantially uniform maximum intensity merging into a second coating portion of changing intensity that merges into a third coating portion of finely reduced intensity that merges into a barely perceptible cut-off line between coated and uncoated portions.

This invention is especially concerned with the partial coating of flexible interlayer material that is a component of laminated glass used in automobiles. The partial coating according to the present invention is performed in such a manner that it is unnecessary to differentially stretch partially coated interlayer sheets removed from a continuous ribbon to provide a curved cut-off line along the edge of the colored portion so that when the partly dyed interlayer is laminated to one or more curved sheets of rigid transparent material, such as glass or a recognized rigid transparent plastic substitute for glass such as polycarbonates, acrylic plastics, polyesters and rigid polyurethanes (hereinafter also referred to as glass), the cut-off line between the coated and uncoated portions will appear to have a horizontal line in the curved laminated windshield installed in an inclined relation in an automobile frame.

In electrostatic spraying of sheets of interlayer material as practiced by the prior art, a non-conductive workpiece is exposed to highly charged particles of a dye composition. A grounded shield of electroconductive material is interposed between an electrostatic spray gun and the workpiece and a manifold is located behind the outboard edge of the grounded shield and between the lower surface of the shield and the upper surface of the workpiece to provide a positive pressure of a non-reactive fluid, such as air, in the direction of the edge of the grounded shield parallel to the surface of the workpiece being coated so as to reduce the intensity of underspray that is deposited on the upper surface of the workpiece in facing relation to the shield. Grounding the shield selectively attracts many highly charged particles of dye contained in the dye composition that would otherwise mutually repel one another and deposit on the upper surface of the workpiece in the region over a wide area facing the shield and extending laterally from its inboard edge.

Nevertheless, in large scale production runs, liquid spray composition accumulates on the lower surface of the shield to such an extent that droplets of the accumulated spray composition larger than the particles of the electrostatic spray fall on a workpiece to spoil its optical properties where the droplets form. Furthermore, despite the force of manifold air, particles of spray composition tend to accumulate on the manifold, which faces an area of the workpiece desired to be free of coating. When the accumulation builds up sufficiently during a production run, a thin, second band of color is imparted to the workpiece along a line facing the manifold in a region desired to be uncoated.

The concept of applying paints and other tinting compositions by an electrostatic spray system has been developed. U.S. Pat. No. 3,645,477 to Cowen discloses an air atomized electrostatic spray device in which air is supplied to the device for the purpose of atomizing a liquid to be sprayed. The air is also employed for operating a self-contained electrogasdynamic power generator for charging the atomized coating material and for maintaining an electrostatic depositing field having one terminus adjacent the locus of atomization. A highly charged atomized mist is imparted to a substrate to be coated. Electrostatic spraying develops a coating of a given intensity characterized by a low transmission coefficient more rapidly than older spraying methods.

The mist so produced comprises highly charged particles that mutually repel one another during the electrostatic spray process. This mutual repulsion causes the particles to spread over a wide area en route to a substrate to be coated. Hence, the electrostatic spray process is suitable for coating an entire substrate uniformly. When an electrostatic spray is applied to an exposed portion only of a substrate, the mutual repulsion of the spray particles causes the electrostatic spray particles to deposit on a large area outside of the exposed portion to which the electrostatic spray is applied and form a pattern of gradually reducing intensity within said large area outside of said exposed portion. Even the interposition of a mask or shield, which controls the boundary in operations in which hydrolyzable salt compositions and sprays other than electrostatic sprays are applied to form coatings in the form of a band, fails to avoid extensive areas of fade-out in coatings applied by electrostatic spraying.

Since the details of the electrostatic spray device does not form part of the present invention and such devices are readily available commercially, the details of the spray gun or power generator for use with the spray gun will not be described in detail in this specification. However, details of a suitable electrostatic spray device may be found in U.S. Pat. No. 3,645,447 to Cowen and details of a suitable electrogasdynamic generator for such a suitable electrostatic spray device are recited in U.S. Pat. No. 3,651,354 to Cowen. The disclosures of these patents relative to an electrostatic spray device and an electrogasdynamic generator for such a device are incorporated herein by reference in order to avoid an excessively long specification.

When the cut-off line between the coated and uncoated portions of a partially dyed interlayer sheet incorporated in a shaded laminated windshield is too abrupt, an optical illusion in the form of a line parallel to and spaced from the curved cut-off line of the shaded laminated windshield becomes visible. Such a line of optical illusion is hard to avoid when the colored band is applied by printing or by spraying using a mechanical shield interposed in the path of the spray. Interposing a manifold in spaced relation behind the edge of a shield and blowing a gentle flow of air or other non-reactive fluid between the shield and the sheet to be coated improves the ability to avoid the optical illusion, particularly when the spray is applied electrostatically and the shield is composed of electroconductive material and is grounded. The particles of an electrostatic spray are highly charged and tend to repel one another. This mutual repulsion tends to spread the cut-off portion of the resulting coating over a wide area. A grounded shield attracts a portion of the highly charged particles, thus reducing the intensity of the coating that forms in the cut-off portion of the coating, and providing a more gradual change in intensity near the cut-off line.

2. Description of the Prior Art

U.S. Pat. No. 2,676,114 to Barkley discloses various methods of producing graded coatings by vacuum evacuation from a line of several evaporation sources disposed in alignment with the direction of gradation of coating using one or more shields interposed between a line of evaporation sources and the workpiece to be coated. Such coatings develop sharp lines of demarcation between coated and uncoated areas and between adjacent areas exposed to different numbers of evaporation sources and between adjacent areas shielded by a different number of shields interposed between the sources and the workpiece. This technique uses mechanical barriers to apply graded coatings to glass sheets.

U.S. Pat. No. 3,004,875 to Lytle discloses applying a band of metal salt composition at an oblique angle toward an edge portion of a substrate to be coated, using a shield to limit the area of application of the coating composition. The resulting band is of gradually increasing intensity from its boundary with the uncoated portion and the edge of the substrate containing the band. Furthermore, the resulting band has a mottled appearance, particularly in its boundary portion adjacent to the edge of the shield because of eddies that evolve beneath the shield near the edge of the shield during the coating operation.

U.S. Pat. No. 3,113,034 to Fix discloses applying a band of coloring material having a repetitive pattern of curved cut-off line to a continuous sheet of flexible plastic interlayer material using a roller coater to which dye is imparted for imparting said dye to a surface of the sheet while the roller coater simultaneously rotates and reciprocates axially against said sheet while the latter moves past the roller coater. While this principle of transferring dye has been established, the process has not completely eliminated some residual blur in the applied dye pattern due to the rubbing action of the roller against the flexible plastic interlayer material so that the cut-off line between dyed and undyed portions appears fuzzy.

U.S. Pat. No. 3,078,693 to Lytle discloses applying a metal salt composition to a portion of a hot glass sheet to form a metal oxide coating and then laminating the coated glass sheet to one side of a plastic interlayer. The metal oxide films have a mottled appearance which is not removed by lamination.

U.S. Pat. No. 2,088,542 to Westin impinges one or more currents of gas into an atomized spray of coating composition at a point closer to the substrate to be coated then to the point of origin of the jet to delimit the coated area from the uncoated area. A sharp line of demarcation results between the coated area and the uncoated area.

U.S. Pat. No. 2,082,182 to Schacht uses a shield to confine the flow of pulverulent particles toward a substrate and forms a sharp line of demarcation between the coated and uncoated portions of the substrate.

U.S. Pat. No. 1,861,475 to Hopkins and Odgen uses compressed air to confine the application of a spray of lacquer. The sprayed portion is sharply separated from the unsprayed portion.

U.S. Pat. No. 2,283,253 to Haven controls the width of a line of metal formed by spraying metal particles upon a glass substrate at an oblique angle thereto by providing a guard member positioned between the spray source and the substrate. The spray, on passing the edge of the guard member, causes the formation of eddies that set up back sprays, which form a metal mist upon the glass beyond the area desired to be coated. Gaseous fluid is provided under pressure beneath the guard member to counteract the formation of the eddies and prevent the metal particles from passing beneath the guard member. The resulting boundary between the coated line of opaque metal and the uncoated transparent portion is sharp and abrupt, not gradual as desired for purposes of the present invention, even though the boundary portion of metal may be tapered.

U.S. Pat. No. 3,305,336 to Browne et al discloses a spray gun system for applying a film on a glass surface. The film is formed on a band having a major area of maximum intensity bordered by a fade-out line that defines a fade-out area in which the transmittance of the film gradually and progressively increases until its value reaches the clarity of the glass substrate. This patent refers to conventional spray techniques rather than electrostatic spray techniques.

None of the aforesaid patents relate to applying a colored coating having across its transverse dimension a main relatively wide first coating portion of essentially uniform maximum intensity that merges into a second coating portion of graded intensity which, in turn, merges into a third, relatively narrow, boundary coating portion of feathered intensity by electrostatic spraying. None of the aforesaid patents was confronted with the problem of having to alter a selected portion of a uniform spray pattern resulting from the mutual repulsion of electrostatically charged particles into a portion of graded intensity.

A copending patent application of Dennis S. Postupack, U.S. Ser. No. 868,013, filed Jan. 9, 1978, now U.S. Pat. No. 4,138,284 for Method of Forming Graded Shade Band on Substrate, discloses a method and apparatus for applying a shade band by electrostatically spraying a dye composition past a grounded electroconductive shield and using a combination of a single grounded shield and a manifold between the shield and the substrate to control the location of the cut-off line between the coated and uncoated regions of the substrate and to limit the amount of dye deposited in the vicinity of the cut-off line. While this system was successfully used to produce a coating having a finely graded cut-off portion of diminishing intensity such as would be capable of avoiding a line of optical illusion parallel to the cut-off line, further developments are needed to produce a more complicated pattern of gradation that incorporates the finely graded cut-off line between coated and clear portions.

SUMMARY OF THE INVENTION

According to the present invention, one or more electrostatic spray guns are operated while facing and moving longitudinally of an elongated area to be coated to apply a colored band having a desired transverse intensity pattern, a specific example having a first coating portion of essentially uniform maximum intensity merging into a second coating portion of graded intensity, and in turn merging into a third coating portion of finely graded diminishing spray concentration that terminates in a barely perceptible cut-off line between the coated area and an uncoated region of the workpiece along an elongated area of a workpiece, preferably a flexible sheet of polyurethane or plasticized polyvinyl butyral. It has now been found that a novel multiple shield system located in closely spaced relation to the surface of the workpiece provides more precise control of the pattern of coating portions including more gradual merging from portion to portion than multiple mechanical shields provide.

The multiple shield system comprises a grounded primary shield of electroconductive material spaced a distance of about 1 to 5 millimeters from the surface of the workpiece to be coated and a grounded secondary shield, also of electroconductive material, spaced more than 5 millimeters from the primary shield in a direction away from the workpiece. One or more electrostatic spray guns are oriented to apply a highly charged spray of dye composition toward a surface of the workpiece about an axis obliquely disposed relative to the surface of the workpiece to be partly coated. The distance from the spray gun orifice to the secondary shield is at least 90% of the distance from the spray gun orifice to the workpiece surface.

Both shields have an outboard edge curved to conform to the shape desired for the curved cut-off line for the elongated area to be coated. The outboard edge of the secondary shield is so located with respect to the electrostatic spray that the secondary shield intercepts a portion of said spray. A first spray portion not intercepted by said secondary shield deposits on the workpiece to form a first coating portion of substantially uniform and maximum intensity. Part of the spray that passes adjacent the outboard edge of the secondary shield en route to the substrate forms an underspray beneath the secondary shield.

The primary shield is located with its curved inboard edge in the shadow of said secondary shield. Part of the underspray forms the second coating portion of graded intermediate intensity, the amount of intensity being regulated by the tendency of the lower surface of the grounded secondary shield and the upper surface of the grounded primary shield to attract some of the highly charged particles of dye composition that would otherwise deposit on the substrate surface over a relatively wide area. Still another part of the overspray passes in the vicinity of the inboard edge of the primary grounded shield and some of the latter is attracted to the grounded primary shield while a very small remainder deposits on the portion of the workpiece surface facing the primary shield to form the third coating portion of the band of coating applied to said elongated area. In the absence of a ground, the third coating portion would be widely dispersed over the surface portion of the workpiece and would include an area of the workpiece desired to be free of coating.

The primary grounded shield delineates a narrow band of finite width that forms a boundary zone of sparse intensity adjacent a barely perceptible cut-off line between the clear and the coated portion of the workpiece. The primary shield also receives on its top surface dye particles or liquid droplets containing dye particles that, in the absence of the primary shield, would tend to agglomerate in larger sizes and then deposit on the upper surface of the workpiece to spoil its optical properties so that it cannot be used as an interlayer.

If the primary shield contacts the workpiece or is spaced less than 1 millimeter therefrom, the cut-off line is sufficiently sharp to result in a line of optical illusion parallel to the curved cut-off line. If the grounded primary shield is spaced more than 5 millimeters from the workpiece, control of the location of the cut-off line between the coated and uncoated portions is reduced and may even be lost altogether at greater distances between the primary shield and the workpiece.

A manifold may be provided between the primary and secondary shields to provide a band of pressurized air between the shields in a direction toward the outboard edges of the shields. A deflector may be incorporated with the manifold to direct the flow of pressurized fluid along a desired path to further improve the control of the coating pattern.

Another factor of the present invention involves heating a portion, preferably the outboard edge portion of at least the primary shield. Heating the edge of the primary shield causes the liquid component of the droplets that deposit on the edge portion of the primary shield to evaporate. Evaporation of the droplets reduces the tendency of the droplets to form a line of dye on the workpiece aligned with the curved outboard edge of the primary shield.

The primary shield is located close to the surface of the workpiece being coated. Therefore, the amount of liquid dye composition that deposits on its lower surface is limited to adjacent its outboard edge. A heater on the outboard edge portion of the primary shield evaporates the solvent of the dye composition from its lower surface, reducing the tendency for droplets to deposit on the workpiece. The highly charged electrostatic spray particles are attracted to the grounded primary shield instead of the workpiece.

The secondary shield is also heated, particularly when production requires frequent intermittent operation of the electrostatic spray guns. Heating the secondary shield evaporates the solvent from the wet droplets deposited on its upper surface, preferably before a succeeding spray is applied, part of which is intercepted by the upper surface of the secondary shield. The dried dye particles that remain are highly charged and remain attracted to the grounded secondary shield. The evaporated liquid cannot form a liquid film on the upper surface of the secondary shield. When additional spray applied along an axis oblique to the upper surface is intercepted at the upper surface of the secondary shield, it would cause the liquid film accumulated from a previous deposit to splash. Some of the splashed liquid would deposit on the upper surface of the workpiece if the heater did not evaporate the liquid component of the spray composition before the next application of spray composition.

The heater for each shield is preferably of the electrical resistance type to provide a high degree of temperature control. It is important that the temperature of the edge portion of the shields be sufficiently high to evaporate the volatile component of the dye composition applied by electrostatic spray and below a temperature at which the workpiece would be distorted. A preferable range of temperatures is 120° F. (49° C.) to 170° F. (77° C.). A preferred temperature is 140° F. (60° C.).

The electrostatic spray composition contains a volatile liquid vehicle whose boiling point is sufficiently low (preferably within the range of 35° C. to 105° C.) to enable the vehicle to evaporate during spraying of the workpiece. Furthermore, the temperature of the atmosphere at which coating takes place is preferably elevated sufficiently to enhance evaporation of the solvent in transit to the substrate surface. When the substrate is a plastic interlayer composition, such as polyurethane or plasticized polyvinyl butyral, the substrate temperature selected and the environmental temperature are such as to permit evaporation of the solvent during and after spraying with a minimum of chemical reaction with the substrate. Suitable substrate temperatures range from about 70° F. (21° C.) to 125° F. (52° C.) while the environmental temperature preferably ranges from 70° F. (21° C.) to 125° F. (52° C.) when the substrate is a flexible plastic interlayer composition of the group described. The application of the spray composition by electrostatic spraying ensures a more finely divided mist of sprayed composition than other known spraying techniques. In applying the spray to a heated substrate, the liquid component is encouraged to evaporate, leaving a deposit of a series of fine particles onto the heated substrate instead of having the liquid particles of spray composition coalesce to form large droplets that cause a mottled appearance when applied to a relatively cold substrate. When the band of dye is applied to a workpiece in the form of a flexible layer of interlayer material using the electrostatic spray technique of the present invention to provide a curved cut-off line of desired configuration between the coated and uncoated portions, it is not necessary to stretch the layer of interlayer material differentially to obtain a preferred cut-off line.

Since differential stretching causes the interlayer to develop a non-uniform thickness which complicates its uniformity of adhesion to the rigid transparent sheet of the laminate, production of curved laminated safety glass windshields is made more simple and more efficient. The resulting laminated windshields with a colored band of graded intensity is produced without requiring either a step of relative rubbing between a printing roller and an elongated area of interlayer material to be coated or a special step of stretching the interlayer material differentially to provide a curved boundary between the coated and uncoated portions. Hence, the resulting laminated windshields have more uniform optical properties and more finely controlled gradient patterns in their shade band area.

The present invention will be better understood in the light of a description of a preferred embodiment thereof that follows.

BRIEF DESCRIPTION OF THE DRAWINGS

FIG. 4 is an end view normal to the view of FIG. 3 showing the transfer carriage arriving at the coating chamber with parts removed to show a vacuum exhaust and a water curtain that form part of the coating chamber;

FIG. 5 is a view of part of the showing of FIG. 4 showing how the vacuum platen of the transfer carriage is pivoted into a tilted relation for the spray operation at the coating chamber;

FIG. 6 is a plan view of the apparatus of FIG. 1 with certain parts shown schematically for illustrative purposes;

FIG. 8 is an enlarged cross-section of a portion of the shield and manifold system and vacuum platen taken along line 8—8 of FIG. 7;

FIG. 9 is an enlarged cross-section of another portion of the shield and manifold system and vacuum platen taken along line 9—9 of FIG. 7;

FIG. 10 is an enlarged longitudinal view of a portion of a system for reciprocating a bank of electrostatic spray guns, showing a driving chain connected through a vertically slotted member to a moving support for spray guns;

FIG. 12 is a view along line 12—12 of FIG. 11 showing a pair of cam wheel structures individually adjusted at different phases to control the spray from each individual spray gun independently.

DESCRIPTION OF ILLUSTRATIVE EMBODIMENT

Figure 2:
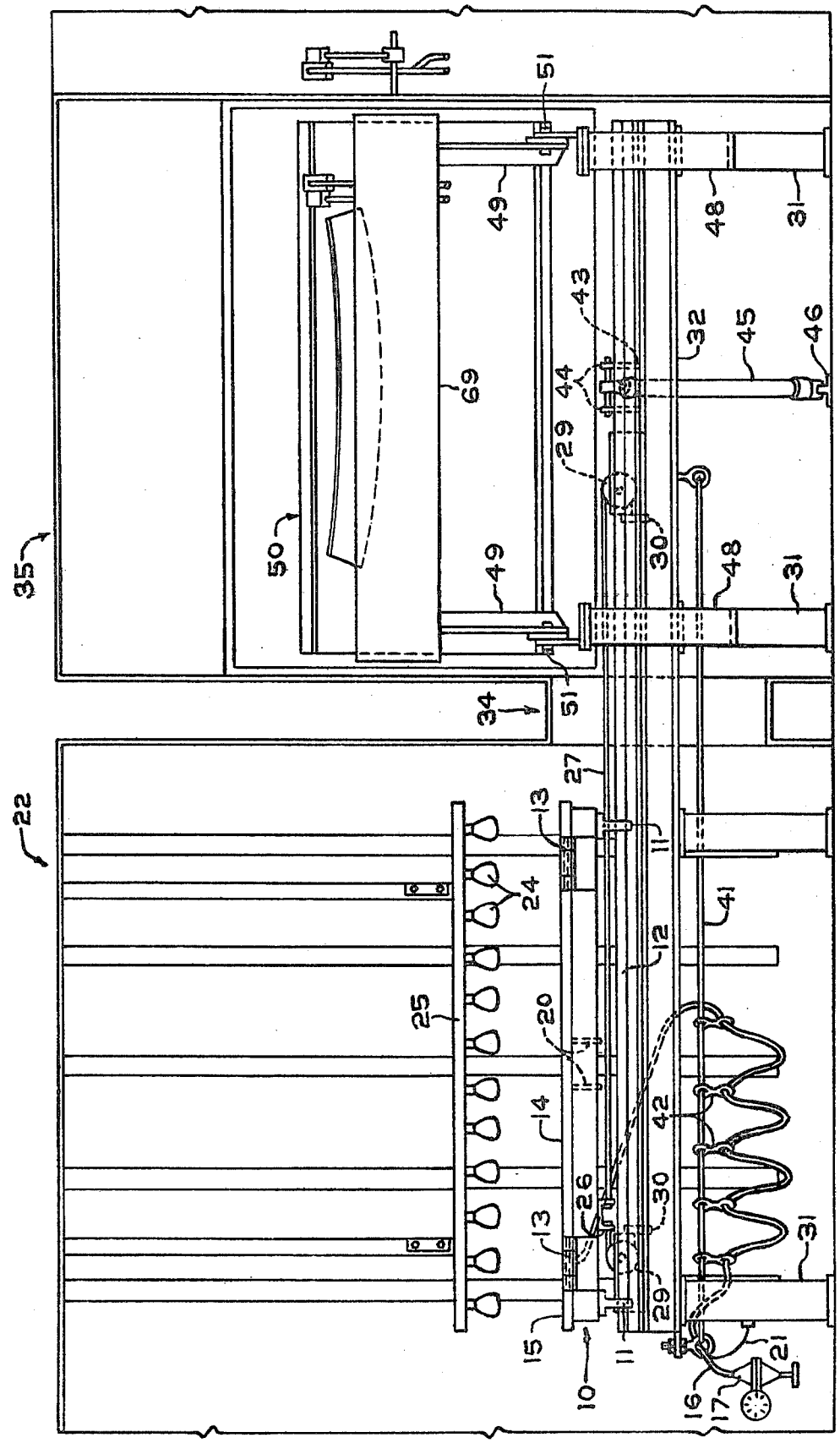
FIG. 2 is a longitudinal elevation of the electrostatic spray system showing a transfer carriage containing a pivotable vacuum platen located at the loading and unloading chamber.
Figure 3:
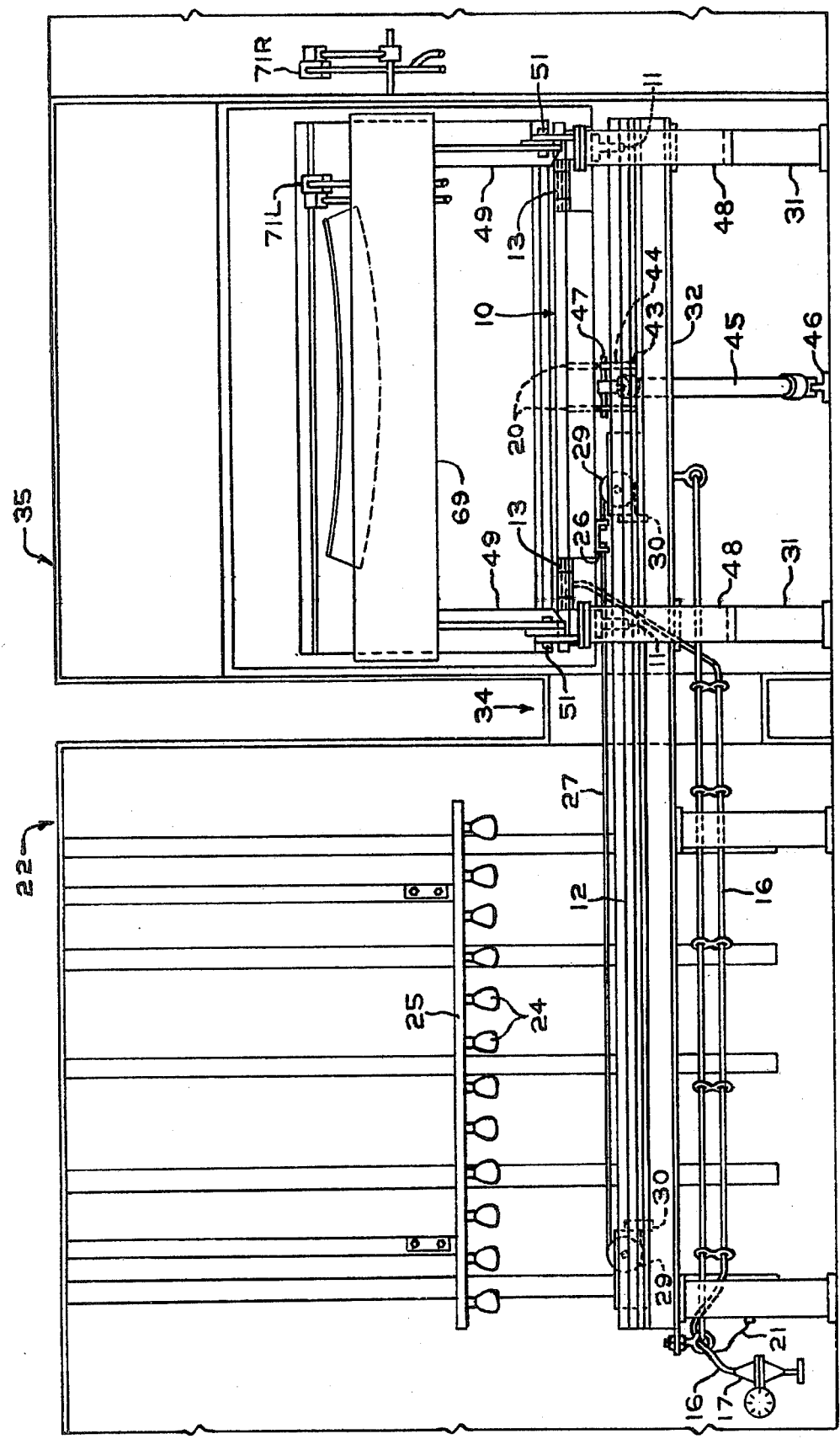
FIG. 3 is a view of the spray system showing the transfer carriage just arriving at the coating chamber.
Figure 7:
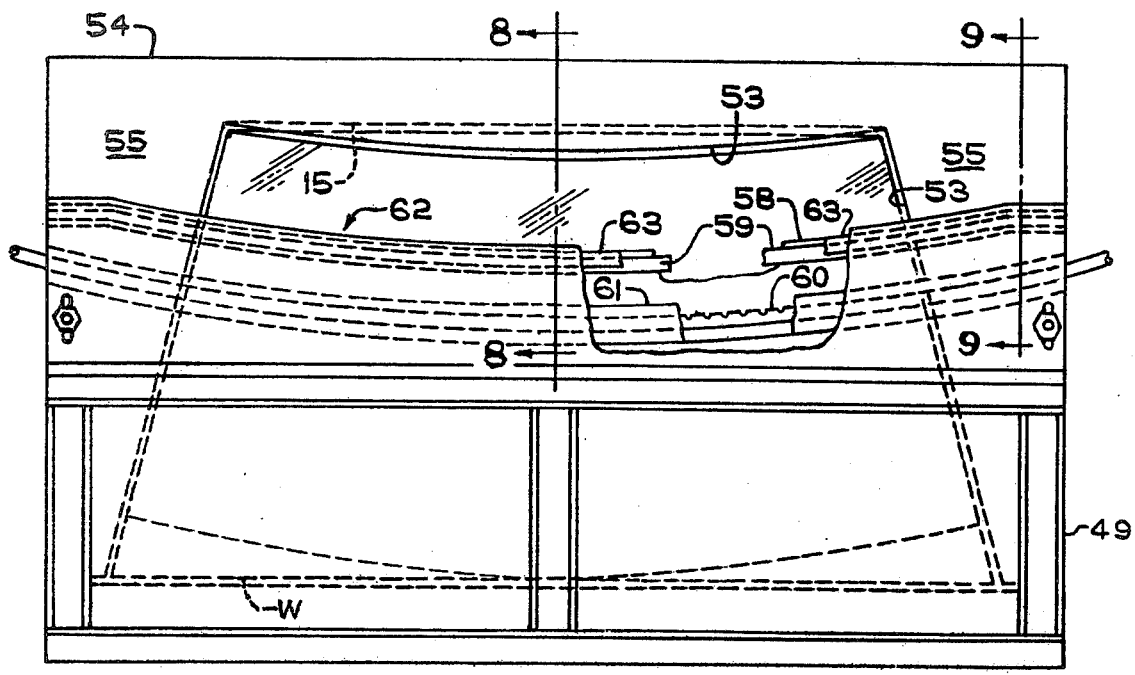
FIG. 7 is an enlarged plan view of a shield and manifold system installed at the coating chamber, showing the relation of the pivoted vacuum platen to the shield and manifold system.
Figure 11:
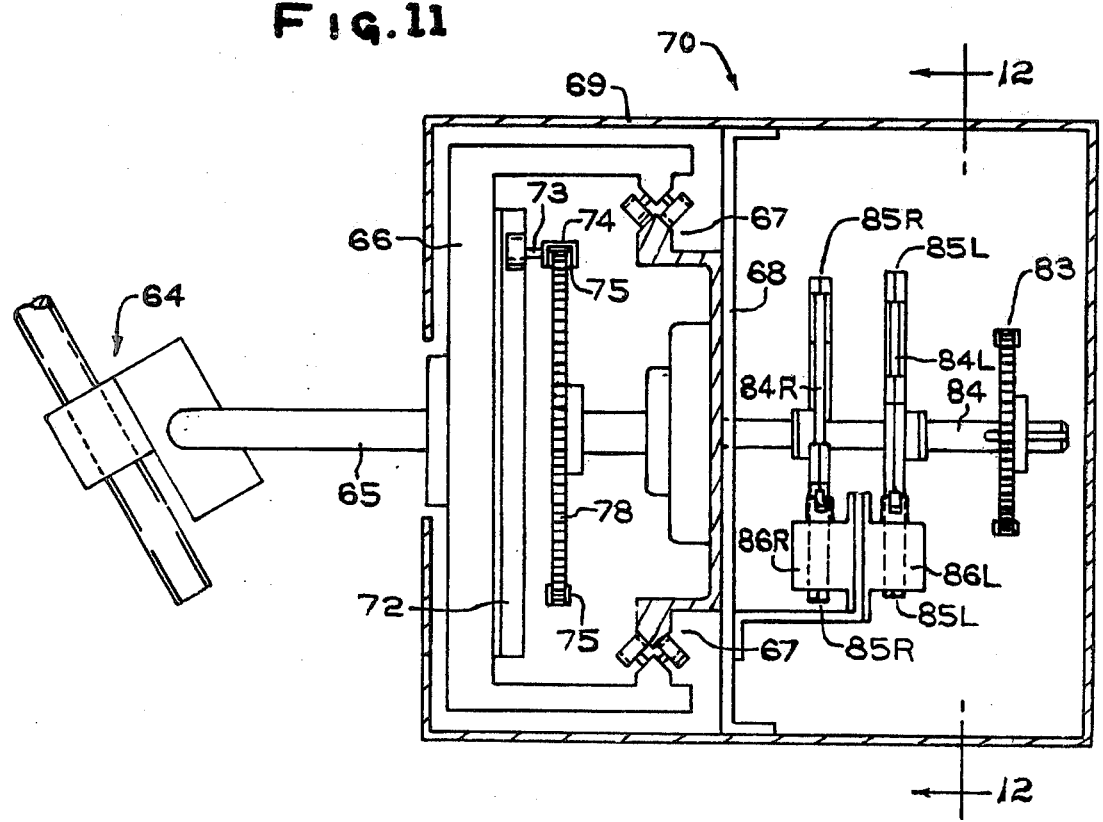
FIG. 11 is a sectional view along lines 11—11 of FIG. 10 showing how spray guns are mounted and driven relative to said spray gun support.

The apparatus comprises a carriage 10 provided with ears 11 slidable along a pair of carriage rails 12. The carriage includes a pair of pivot means 13 (FIGS. 4, 5, and 6) along one longitudinal edge thereof to pivotally support a vacuum platen 14 having a frame-like gasket member 15. The vacuum platen 14 is connected to a vacuum source (not shown) through a flexible hose 16 and a vacuum regulator 17 (FIG. 2) that controls the amount of vacuum in the vacuum platen 14. A suggested vacuum for workpieces of flexible interlayer sheet 30 mils (0.8 mm) thick (also referred to in this specification as substrates) is 7 inches (18 cm) of mercury.

The vacuum platen contains a smoothly surfaced upper wall 18 (FIGS. 8 and 9) that has small apertures 19 uniformly spaced throughout its areal extent. Since the workpiece is of flexible material, the maximum aperture size should approximate the thickness of the workpiece. A suitable array contains apertures of 1/32 inch (0.8 mm) diameter arranged in a checkerboard pattern 1 inch (2.5 cm) square. The frame-like gasket member 15 has a rectangular outer periphery that conforms to the outline of the vacuum platen 14 and a trapezoidal inner periphery conforming to the shape of the workpiece to be treated, only slightly larger to provide a ⅛ inch (3 mm.) marginal space M around the workpiece, is fixed to the peripheral portion of the upper apertured wall 18 of the vacuum platen 14 mounted on carriage 10. It is preferably composed of the same material as the workpiece and has the same thickness as the workpiece to be treated. The vacuum platen includes a pair of downwardly slotted lugs 20 (FIGS. 2, 4, and 5) which extend downward therefrom and which are longitudinally spaced from one another. A grounding cable 21 is intertwined with the flexible vacuum hose 16 and is connected to any suitable ground available to ground the vacuum platen 14. The carriage rails 12 extend from a first chamber 22 which is supplied filtered air under pressure through its roof via an air filtering system (not shown) and a hooded exhaust system 23. The first chamber 22 serves as a loading and unloading chamber.

A longitudinally extending bank of twelve heating lamps 24 is supported by a support bar 25 about six feet long mounted in facing relation over the position occupied by the carriage 10 and the vacuum platen 14 within the first chamber 22. The heating lamps 24 are located to overlie the portion of the flexible sheet of plastic interlayer material (hereafter called the workpiece) that is to be coated with a shade band. The bank of lamps 24 is located about 15 inches (38 cm.) above the plane of support of the vacuum platen 14, although means is provided to adjust the level at which the bank of lamps 24 is supported relative to the vacuum platen.

A lug 26 is rigidly fixed to the bottom of carriage 10 and connects the ends of a cable 27. The latter is entrained over a pair of pulleys 29 and its return run extends through a piston cylinder 30. The piston within piston cylinder 30 is fixed to the return run of cable 27 and is a double acting piston operated through a solenoid valve (not shown) to control the position of lug 26. As lug 26 is fixed to carriage 10, the position of the lug determines the position of carriage 10 along carriage rails 12.

A support structure, which comprises a plurality of vertical posts 31 supporting a pair of longitudinal I-beams 32 interconnected by cross beams 33, supports the carriage rails 12, the pulleys 29 and piston cylinder 30. The longitudinal I-beams 32 extend through the first chamber 22, a narrow connecting chamber 34 and a coating chamber 35. The chamber 34 is the only communication between chambers 22 and 35. An exhaust hood 36 and a recirculating water system 37 is provided to the rear of coating chamber 35. System 37 includes a recirculating pump (not shown) which recirculates water through a pipe 38 onto a oblique wall 39 immediately in front of the exhaust hood 36 onto a reservoir 40 (FIG. 4). Excessive spray is either exhausted through the hood 36 or trapped in the recirculating water from which it may be recovered. The coating chamber 35 is also supplied filtered air at superatmospheric pressure through an air filtering system (not shown). The pressure in the first chamber 22 is slightly higher than the pressure within the coating chamber 35 to prevent excessive spray from transferring to the first chamber 22 by way of the narrow connecting chamber 34.

A taut cable 41, extending parallel to, between and slightly below the longitudinal I-beams 32, is rigidly attached to the support structure for the carriage rails 12 and slidably supports the upper eyes of a plurality of double-eyed members 42 by extending therethrough. The flexible vacuum hose 16 and its intertwined grounding cable 21 are fixed to the lower eyes of the double-eyed members 42 so that when the carriage 10 is at the first chamber 22, the flexible vacuum hose 16 and the grounding cable 21 pull the double-eye members 42 closer together and hang loosely between adjacent members 42. When the carriage 10 is moved to the coating chamber 35, the flexible vacuum hose 16 and grounding cable 21 extend to draw the members 42 apart. Thus, in both the loading and unloading chamber 22 and in the coating chamber 35, the vacuum platen 14 can be evacuated and grounded without concern about carriage movement between chambers.

Within the coating chamber 35, a pair of brackets 43 (FIGS. 2 to 5) is fixed to the inner transverse side of one of the longitudinal I-beams 32. Each bracket 43 supports a crooked finger 44 that has an upwardly open slot. A piston cylinder 45 is pivotally supported at its lower end on piston support means 46 is an oblique orientation in a vertical plane approximately mid-way between the crooked fingers 44. The rod for piston cylinder 45 terminates in a cross bar 47 of sufficient length to have its opposite end portions engage the upwardly open slots of the crooked fingers 44 when the piston rod is retracted within cylinder 45. Thus, the upwardly slotted crooked fingers 44 help support the piston cylinder 45 at an oblique orientation in a vertical plane.

The position of the crooked fingers 44 is such that their upwardly open slots align with the downwardly open slots of the lugs 20 fixed to the bottom of the vacuum platen 14 when the carriage 10 occupies its downstream position at the coating chamber 35. This feature enables the piston for piston cylinder 45 to extend and transfer the cross bar 47 from its recessed position within the upwardly open slots of crooked, upwardly slotted fingers 44 to the downwardly open slots of lugs 20 whenever it is desirable to tilt the vacuum platen 14 smoothly while the latter supports a workpiece W on its upper apertured wall 18 by vacuum whenever the workpiece is to be sprayed with a coating composition.

A limit switch LS-1 is supported by the support structure in position to be engaged by a lug (not shown) at the front end of carriage 10. Another limit switch LS-2 is supported in position to be engaged by another lug (not shown) attached to vacuum platen 14 when the cross-rod 47 is retracted to allow the vacuum platen 14 to return to its position of rest in a horizontal plane on carriage 10.

A shield support system 50 is located at the coating chamber 35 in an oblique position against which the vacuum platen 14 can be pivoted upwardly away from carriage 10 into alignment therewith. The shield support system 50 comprises a pair of L-shaped supports 48 and an open reinforcement structure 49 pivoted to the L-shaped supports at pivot means 51 at a desired oblique orientation. The shield support system 50 is rigidly attached to reinforcement structure 49 to pivot therewith.

The shield support system 50 is supported by open reinforcement structure 49 in an oblique plane in cantilever fashion over the downstream end of the support structure for the carriage rails 12. The pivot support means 51 includes arcuately slotted members that make it possible to angularly adjust the orientation of the shield support system 50. The system 50 can be supported in any oblique plane from 30 to 60 degrees from the horizontal. An angle of 45° transverse to the path of the rails 12 is suitable.

The shield support system 50 includes a platen mask, comprising a lower layer of sponge rubber 52 having a thickness of about ⅛ inch (3 mm) which the marginal portion of the vacuum platen 14 engages when pivoted and an upper metal sheet, preferably an aluminum plate 53 having a thickness of 1/16 inch (1.5 mm), bonded to the upper surface of the layer of sponge rubber 52. The platen mask 52, 53 has an outer rectangular outline and a cutout portion conforming to the shape of the outline of the windshield to contain a partially dyed workpiece. The cut-out portion of the platen mask is similar in shape to the flat development of the curved outline of the windshield but is approximately ¼ inch (6 mm) larger than said curved outline, whereas the workpiece to be treated is a straight sided trapezoid larger in both dimensions.

A skirt 54 of L-shaped section is attached to the aluminum plate 53 of the platen mask and extends around the edge of the plate 53 and extends about 6 inches (15 cm) in a downward direction from the upper surface of the platen mask, except for a cut-out portion where needed for clearance. A thin layer 55 (about 30 mils—0.76 mm thick) of dye absorbing material such as sponge rubber or plasticized polyvinyl butyral covers the metal plate 53 in its otherwise exposed area not covered by a primary shield 58 or a secondary shield 62 to be described later.

The open reinforcement structure 49 supports a primary grounded shield 58 of aluminum ⅛ inch (3 mm) thick provided along a curved, laterally outer, longitudinally extending side portion of its upper surface with an electrically insulated heating element 59 in the form of an electroconductive tape that is insulated by a non-electroconductive carrier tape from the primary shield 58 and extends transversely inward from about ¼ inch (6 mm) inward from a longitudinally curved upper edge of the primary shield edge and is 1 inch (25 mm) wide. Primary shield 58 is bonded to the upper surface of metal layer 53 by a suitable silicone adhesive.

An apertured pipe manifold 60 of circular cross-section is supported on the upper surface of the primary shield 58. The manifold 60 is provided with a series of apertures that extend radially through the wall of the pipe manifold 60 in a common plane. Preferably the apertures are spaced at equal distances along the length of the manifold, have equal diameters to one another and are directed at the same orientation relative to the manifold anywhere from a slight angle upward to a slight angle below the equatorial plane of the pipe manifold. Preferably, the apertures are arranged between an angle 30 degrees to the north of the horizontal equatorial plane and an angle 30 degrees to the south of the equatorial plane extending horizontally across the cross-section of the manifold. The manifold is located a sufficient distance behind the laterally outboard longitudinal edge of the grounded primary shield 58 so that blasts of fluid imparted through the apertures blend with one another to form a substantially uniform pressure bed in the direction from the manifold 60 to beyond the laterally outboard edge of the grounded primary shield and toward the elongated area of the workpiece W to be coated.

The manifold must be located a minimum distance from the edge of the shield sufficient to enable the individual air blasts to merge before they contact the spray of liquid dye composition applied to the substrate. If the manifold is so close to the edge of the shield that the blasts from the manifold are discrete in the vicinity of the edge of the shield, the boundary of the portion of the band having graded intensity tends to have a saw-tooth pattern. However, the manifold must be sufficiently close to the edge of the shield supporting the manifold that the air blasts provide sufficient pressure to divert the charged particles of the liquid dye composition mist from the portion of the substrate that is desired to be maintained uncoated and to have a varying effect on the portion of the substrate immediately inward and immediately outward of the line directly below the edge of the primary shield.

For an air flow of 0.0012 standard cubic meters per second flowing through a manifold 45 inches (114.3 centimeters) long having an inner diameter of 0.5 inch (1.27 centimeter) and 88 equally spaced, axially aligned apertures spaced 0.5 inch (1.27 centimeter) center to center, each having a diameter of 1/16 inch (1.59 millimeter), a suitably uniform boundary is obtained between the coated and uncoated portions when the manifold is located between 4 inches (10 centimeters) and 7.5 inches (19 centimeters) from the edge of the shield. Smaller diameter apertures are impractical to drill because the number of apertures needed per unit length of manifold varies inversely with the square of the diameter of the individual apertures. Larger diameter apertures must be spaced farther apart than those used and are more difficult to obtain blending unless the manifold is located a larger distance from the edge of the shield than is the case with the manifold used, thereby requiring a greater rate of air flow than that required for the manifold described.

Larger diameter apertures may be used with larger diameter pipe manifolds, provided the manifold to shield edge distance is adjusted to be sufficient to avoid a saw-tooth pattern along the boundary of the band between the coated portion and the uncoated portion of the substrate. Also, using larger diameter pipe manifolds limits the minimum distance that a secondary shield 62 (to be described later) may be located above the substrate, thus limiting the minimum width of the second coating portion of graded intensity that may be obtained by this technique.

In a specific embodiment of this invention, a manifold 60 is formed from an apertured tube of aluminum having an outer diameter of ¾ inch (19 mm) and a longitudinal shape to conform to that of the laterally outboard, longitudinally extending, upper curved edge of the primary shield 58, which in turn conforms to the shape of the cut-off line for the shade band to be applied to the workpiece. The manifold 60 is partly encompassed within a grounded metal deflector 61 coextensive in length and shape with the longitudinally curved edge of the primary shield 58. The deflector 61 is curved arcuately in cross section to cause the blasts of air from the manifold apertures to be deflected obliquely beyond the upper surface of the primary shield 58 and to form a diffuse pattern of air pressure directed away from the manifold 60. If customer requirements are not too rigid for the optical properties of the fade-out region of the shade band, the manifold 60 and the deflector 61 may be eliminated.

A secondary heated and grounded shield 62 is disposed atop the manifold 60 with a longitudinally extending curved laterally outboard edge having a shape corresponding to the corresponding curved edge of the primary shield 58. A thin layer 56 similar to thin layer 55 is bonded to the upper surface of secondary shield 62. The longitudinally curved edge of the secondary shield 62 overlaps the corresponding curved longitudinal edge of the primary shield by approximately 3/16 inch (5 mm). The secondary shield 62 is grounded like the primary shield and is provided along its laterally outboard curved edge portion with an insulated heating element 63 that faces the heating element 59 attached to the primary shield 58. Both the primary and secondary shields are grounded electrically and are heated along their curved marginal edge portions to a temperature of approximately 140° F. (60° C.).

For a spray gun to workpiece distance of 10 inches (25 cm) to 16 inches (40 cm) and an orientation of 40 to 50 degrees between the spray gun axis and the upper surface of the workpiece W, the relative positions of the substrate, the primary shield and the secondary shield is preferably maintained even in the absence of the manifold 60 and the deflector 61.

Air is supplied to the manifold 60 from an air supply source at a controlled pressure of 10 to 30 pounds per square inch (0.7 to 2 atmospheres). A single supply source (not shown) communicates with the ends of the manifold 60 through a tee and flexible tubing so that air under pressure is supplied to the ends of the manifold toward the center thereof so as to ensure a uniform pressure throughout the entire length of the manifold.

To one side of the support structure for the carriage rails 12 at the coating chamber 35, an enclosed housing 69 supporting a reciprocating electrostatic spray control system 70 is located. The spray system is a modified Binks reciprocating system. The system includes a pair of electrostatic spray guns 71L and 71R (Electrogasdynamic spray guns obtainable from EGD Speeflo, Inc., Houston, Texas) disposed approximately 18 inches apart in the direction parallel to the length of the carriage rails 12 along which the carriage 10 is moved beween the first chamber 22 and the coating chamber 35. It is understood that the number of spray guns and their relative spacing may be changed without departing from the gist of the present invention. Each spray gun has an air supply line A and a solution supply line S that supplies air and a spray solution, respectively, to a mixing chamber for delivery through an adjustable spray head in a manner well known in the spraying art.

Spray guns 71L and 71R are mounted for positional adjustment on a framework 64 of interconnected rods and brackets that are pivotably and/or slidably adjustable with respect to one another to permit each spray gun to be adjustable in position and orientation with respect to one another and with respect to the shield support system 50. The framework 64 is connected through a connecting rod 65 to a channel-shaped carriage 66, which is supported for linear reciprocating movement along upper and lower tracks 67. The latter are supported by a channel shaped support 68 within a closed housing 69 that encloses the spray gun control system 70.

While the tracks 67 are disclosed as straight, horizontal tracks that control linear horizontal reciprocating movement of the carriage 66 therealong, it is understood that curved tracks may be used. The longitudinal shape of the tracks 67 define the path along which the spray guns 71L and 71R move.

The channel shaped carriage 66 incorporates a vertically slotted member 72 that receives a finger 73 extending from a lug 74 attached to a link of a driving chain 75. A drive motor 76 is connected through reduction gearing 77 to the driving chain 75. The latter extends over an idler sprocket 78 at the downstream end of the housing 69 and a driving sprocket 79 at the upstream end of the housing 69.

Figure 1:
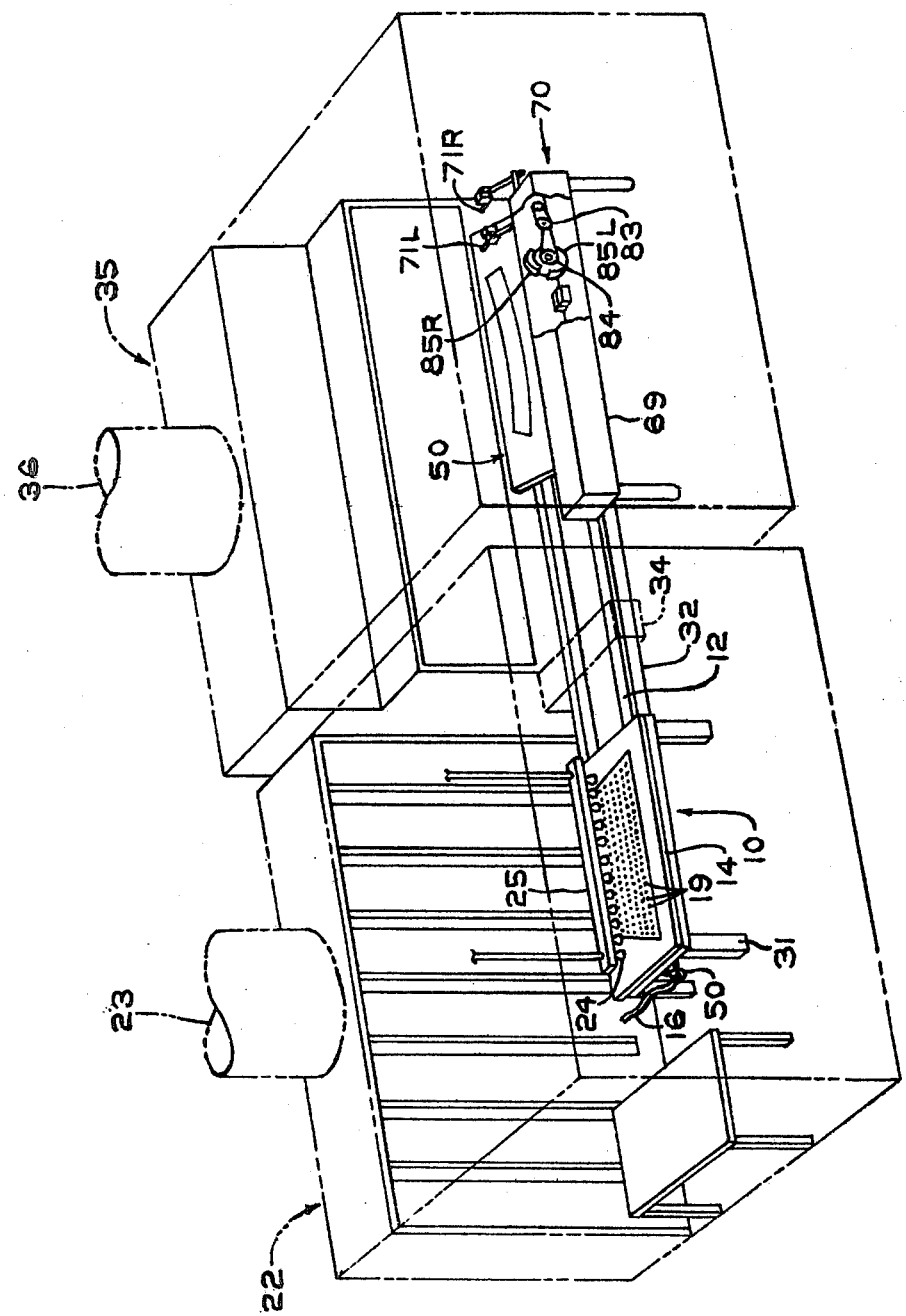
FIG. 1 is a fragmentary perspective view of an electrostatic spray system comprising a loading and unloading chamber and a coating chamber with certain parts removed to show certain hidden parts.

A chain drive system 83, which serves both as a chain tightener and a speed reducer, (FIGS. 1 and 6) connects the shaft for idler sprocket 78 to a common shaft 84, to which are fixed a pair of cam wheels 84L and 84R, each provided with a pair of arcuately slotted cam lobes 85L and 85R (FIG. 12). A valve control switch 86L for spray gun 71L is actuated by engagement of either of its associated cam lobes 85L to actuate a valve which controls the flow of air through an air line A to actuate spray gun 71L according to a predetermined cycle based on the position of cam lobes 85L relative to cam wheel 84L that controls the application of spray composition to the spray gun 51L. The other cam wheel 84R for spray gun 71R has its arcuately slotted cam lobes 85R angularly adjusted at different settings from the cam lobes 85L and operate a control switch 86R to open a valve controlling the actuation of spray gun 71R according to a different predetermined cycle.

The chain drive system 83 is provided with chains and sprockets so constructed and arranged to cause the common shaft 84 to rotate a full revolution with cam wheels 84L and 84R when the lug 74 completes a full circuit while driven by the driving chain 75. The angular settings of the cam lobes 85L and 85R for each cam wheel 84L and 84R are arranged so that when the lug 74 moves from its home position at the right or downstream end of the coating chamber 35 at the beginning of a cycle, the lug 74 moves from right to left along the bottom run of driving chain 75, idler sprocket 78 rotates in a clockwise direction to cause common shaft 84 to rotate in a clockwise direction to rotate the cam wheels 84L and 84R therewith in unison. As the lug 74 moves to the left, it urges the channel shaped carriage 66 to move to the left to move the spray guns 71L and 71R therewith. When spray gun 71L reaches a position facing the right end boundary of the exposed portion of the workpiece W, the cam lobe 85L actuates control switch 86L to actuate the left spray gun 71L. As the movement of the spray guns and the rotation of the common shaft 84 continues, the cam lobe 85R actuates control switch 86R to actuate the right spray gun 71R. As lug 62 continues from right to left, cam lobe 85L rotates beyond engagement with control switch 86L to deactivate the left spray gun 71L while the cam lobe 85R continues to move while engaging control switch 86R to maintain spray gun 71R operative. This continues until the right spray gun 71R passes beyond the left boundary of the exposed portion of the workpiece W. At this time, cam lobe 85R moves beyond engagement with control switch 86R to inactivate the right spray gun 71R. Neither spray gun operates while the lug 74 moves with driving chain 75 up the slot of the vertically slotted member 72 to the upper run of driving chain 75 and moves from left to right until the other cam lobe 85R on cam wheel 84R rotates into engagement with valve control switch 86R to actuate the right spray gun 71R when the right spray gun 71R approaches the left boundary of the exposed area of the workpiece W. The other cam lobe 85L on cam wheel 84L later engages control switch 86L to actuate the left spray gun 71L when the left spray gun 71L approaches the left boundary of the exposed area of the workpiece W. Both spray guns remain activated until the other cam lobe 85R disengages from control switch 86R when right spray gun 71R passes beyond the right boundary of the exposed portion of the workpiece W. At the proper moment when spray gun 71L passes the latter boundary, the other cam lobe 85L on cam wheel 84L disengages from control switch 86L to inactivate the left spray gun 71L.

The angular adjustments of the pairs of arcuately slotted cam lobes 85L and 85R around cam wheels 84L and 84R insures that the onset and completion of spraying from each spray gun is correlated with the time that each spray gun in turn is aligned with the elongated area of the workpiece that is to be exposed to the spray. This control system efficiently utilizes the amount of spray composition that is applied and reduces the amount of spray composition either lost via the exhaust hood 36 or that can be recovered from the recirculating water system 37.

A counting switch CS is located near the driving sprocket 79 for actuation by the channel shaped carriage 66 whenever the latter reaches the upstream extremity of its linear reciprocation. A home switch HS is located near the idler sprocket 78 for actuation by the carriage 66 when the latter arrives at its home position. The counting switch CS operates a counting circuit which actuates the home switch HS to stop the drive motor 76 when the carriage 66 contacts the home switch HS on its return run after the counting switch CS counts a predetermined number of cycles which is correlated with the amount of shading desired and the amount of dye composition applied to the exposed longitudinal area of the workpiece being sprayed during each cycle.

Initially, a flexible sheet of clear interlyaer material of trapezoidal shape, which forms a workpiece W, is mounted in unwrinkled condition on the vacuum platen 14 with its marginal portion within the frame provided by the inner trapezoidally shaped edge of the gasket 15 while the platen 14 rests horizontally on the carriage 10, which is at its upstream position at the first chamber 22. The horizontal orientation of the vacuum platen facilitates loading the flexible workpiece thereon in an unwrinkled condition. FIG. 8 shows the marginal space M between workpiece W and gasket 15.

When the flexible sheet is loaded, the operator pushes a vacuum control button (not shown). The latter initiates operation of a vacuum pump to establish a vacuum in the vacuum platen 14 (preferably controlled at about 7 inches (18 cm) of mercury) to hold the flexible sheet in unwrinkled condition against the apertured upper surface of the vacuum platen. The size of the apertures 19 for the upper wall 18 of the vacuum platen 14 must be limited to a maximum not exceeding the thickness of the flexible workpiece so that the apertures do not dimple the flexible workpiece. The vacuum applied need not exceed the minimum required to hold the workpiece against the apertured upper wall 18 and should be limited to avoid sucking the flexible workpiece into the apertures. Another button initiates operation of the piston in piston cylinder 30 that causes carriage 10 to transfer from the first chamber 22 through the narrow connecting chamber 34 to the coating chamber 35.

When the carriage moves forward to its downstream position, its leading edge actuates limit switch LS-1, which causes the piston in oblique piston cylinder 45 to lift, thereby lifting the cross bar 47 from the rigidly supported upwardly slotted fingers 44 to the downwardly slotted lugs 20, thereby pivoting the vacuum platen 14 upwardly to an oblique position where the workpiece has its elongated area to be coated in alignment behind the aperture formed by the shield support system 50. The vacuum continues to operate to hold the workpiece W against the tilted vacuum platen 14 throughout the rest of the coating cycle. Limit switch LS-1 also energizes a timer circuit, which times out to actuate the drive motor 76 for the driving chain 75, thus moving the spray guns 71L and 71R from their home positions at the downstream end of the coating chamber 35 in an upstream direction and then returning the spray guns to their home positions for one or more cycles along a path of reciprocation defined by the tracks 67 within the housing 69. The number of cycles of reciprocation is predetermined for each pattern run by setting the counting switch CS.

Air at low pressure is continuously supplied to the spray gun heads to keep the spray gun orifices clean. This can be done by a well known expedient of the spray gun art of providing a narrow bleeder passage to the movable valve element that actuates the spray gun operation.

The spray guns 71L and 71R are located about 10 inches (25 cm) to 16 inches (40 cm) from the exposed surface of the workpiece W and are oriented to have their spray heads direct electrostatic spray composition generally horizontally toward the workpiece, while the latter is oriented obliquely and supported by vacuum against the vacuum platen 14. In a typical preferred mode of operation, the spray guns move relative to the workpiece at a speed of 8.2 inches (208 mm) per second along a path of reciprocating movement such that there is a distance of about 14 inches (355 mm) from the spray gun orifices to the exposed surface portion of the flexible workpiece measured along the axis of each spray in a direction transverse to the path of carriage and spray gun reciprocation. At this speed of reciprocation, the amount of spray applied is correlated with the concentration of dye in the spray composition and the number of passes that each spray gun makes when it passes the exposed portion of the workpiece to be sprayed to provide a graded shade band of desired intensity toward the elongated area to be coated.

When the spray guns have reciprocated the desired number of times as determined by the counting switch CS, the latter actuates the home switch HS to stop the drive motor 76 when the spray guns return to their home positions. The home switch HS, when contacted by a lug on carriage 66, also actuates the piston in piston cylinder 45 to retract, thus returning the vacuum platen 14 to a horizontal orientation on carriage 10, and, in addition, actuates a timer circuit that actuates the piston in piston cylinder 30 after about 2.5 seconds to return the carriage 10 with vacuum platen 14 supported in a horizontal orientation thereon to the loading and unloading chamber 22. The heating lamps 24 radiate downward onto the coating in the coated elongated area to further help evaporate any remaining liquid from the coating before the workpiece W is removed and replaced with another flexible sheet of clear interlayer material of trapezoidal outline shape on the vacuum platen 14. The platen is without vacuum during the removal and loading steps.

In the illustrative embodiment of the present invention, two electrostatic spray guns deliver to the substrate a dye solution comprising preferably about 1 to 2 percent by weight dye components in a solvent system composed of a combination of tetrahydrofuran and N-lower alkyl-pyrrolidone, preferably about 75 to 85 percent by volume tetrahydrofuran and about 15 to 25 percent by volume N-methyl-pyrrolidone. This solvent system satisfies the requirements of high dye solubility, preferably greater than 2 percent, and proper volatility to assure optical uniformity in the shade band. Nonuniformity in the shade band is caused by both too low volatility, which results in a mottled texture, and too high volatility, which results in undissolved dye particles being physically bound to the surface of the substrate. This solvent system is also an acceptable solvent for the anti-oxidants and ultraviolet light stabilizers which are preferably added to the dye components to insure longer life for the resultant windshields.

Suitable dye solutions comprise a mixture of organic dye components, blended to yield a desirable color. A preferred dye mixture is a blend of blue, yellow and red-violet dye components. A preferred blue dye component comprises an anthraquinone derivative such as 1,4-diethylamino-anthraquinone, available commercially as Calco Oil Blue N. A preferred yellow dye component, such as Calco Oil Yellow G Concentrate, comprises a monoazo compound with a molecular formula of $C_{17}H_{16}O_2N_4$. Both Calco compositions are sold by American Cyanamid Company. A preferred red-violet dye component, such as Solvaperm Red-Violet R, available from American Hoescht Corporation, appears by infrared analysis to be an anthraquinone derivative comprising an amine functionality; however, positive identification was not obtainable. An appropriate blend of the preferred dye components, antioxidants and ultraviolet light stabilizers yields a relatively color fast blue-green colored shade band.

The spray guns 71L and 71R of this embodiment are operated at 50 kilovolts and develop a current of 40-50 microamperes during spraying. For a single cycle of reciprocation using two electrostatic spray guns, a spray of 1.3 grams of a dye composition (37% by weight) of Solvaperm Red-Violet R (American Hoescht) 37% Calco Blue N and 26% Calco Oil Yellow G Concentrate (both Calco dyes from American Cyanamid) in 100 milliliters of solvent consisting of 80 parts by volume tetrahydrofuran and 20 parts by volume N-methyl-pyrrolidone plus 0.12 grams of Irganox 1035 antioxidant and 2.4 grams of Tinuvin 770 ultraviolet light stabilizer (both available from Ciba-Geigy Corporation) applied at a rate of 65cc per minute per spray gun and an air pressure of 95 psi (7 atmospheres) during spraying and approximately 30 psi (2 atmospheres) air pressure between sprays, developed an acceptable spray band. When the coated flexible interlayer is laminated between two sheets of curved glass to form a laminated curved windshield, the mottle observed in the coated portion was slightly greater than that observed in prior art commercial shaded laminated windshields. Two cycles of passes of the spray guns supplied with the spray composition at 35 to 40 cc/minute/spray gun and all other items the same produced laminated windshields whose shaded portions were virtually free of mottle, thus producing optical properties superior to those of the prior art. All laminated windshields containing shade bands produced by the method and apparatus just described were free of rub marks and/or stretch marks that are usually found in laminates produced with sheets of differentially stretched interlayer material.

It is preferable that the coating operation that conforms to the present invention be performed by electrostatic spraying, because electrostatic spraying produces a fine mist of finely divided, highly charged particles, which are less likely to cause mottle in the coated area than coating operations that involve larger discrete particles than those produced by electrostatic spraying.

The distribution of such particles can be effectively controlled by applying the highly charged particles to a non-electroconductive workpiece whose surface area to be coated has a marginal portion adjacent a grounded electroconductive shield. The arrangement of two electroconductive shields arrayed within the last 10 percent of the path of travel of the electroconductive spray makes possible a more gradual merging of the different portions of the graded coating than results from prior art coating procedures using multiple shields and multiple sources of coating composition.

The close spacing of the workpiece surface (from 1 to 5 millimeters) from the primary shield in a direction having a significant component in the direction of the application of the highly charged spray of dye composition toward a surface of the workpiece about an axis obliquely disposed relative to the surface of the workpiece to be partly coated provides close control for the location of the curved cut-off line of the elongated area to be coated. Controlling the distance from the spray gun orifice to the secondary shield to at least 90% of the distance from the spray gun orifice to the workpiece surface makes it possible for the shield system comprising the primary and secondary shields of electroconductive material arranged as described in this specification to attract a sufficient number of highly charged electroconductive spray particles to deviate their path in such a manner that the graded pattern of spray composition has gradually changing intensity between adjacent portions of the coating instead of sharp lines that result from spraying techniques that use multiple shields as mechanical barriers.

The laterally outboard edge of the secondary shield 62 is so located with respect to the electrostatic spray that the secondary shield intercepts a portion of said spray. A first spray portion not intercepted by said secondary shield moves directly to the elongated area and deposits on the workpiece to form a first coating portion of substantially uniform and maximum intensity. Part of the spray that passes adjacent the laterally outboard edge of the secondary shield en route to the substrate forms an underspray beneath the secondary shield. Some of the highly charged electrostatic spray particles are attracted by the grounded shields and are deflected from their straight line path to the elongated area. The amount of deflection depends on the particle charge, the particle speed and its distance from a grounded shield. Thus, different spray particles are deflected different amounts so that a second coating portion of graded intensity is formed adjacent the first coating portion of maximum intensity with a gradual change of intensity from the first coating portion to the second coating portion.

The primary shield 58 is located with its curved lateral outboard edge in the shadow of said secondary shield. Part of the underspray forms the second coating portion of graded intermediate intensity, the amount of intensity being regulated by the tendency of the lower surface of the grounded secondary shield and the upper surface of the grounded primary shield to attract some of the highly charged particles of dye composition that would otherwise deposit on the substrate surface over a relatively wide area.

Still another part of the overspray passes in the vicinity of the laterally outboard edge of the primary grounded shield and some of the latter is attracted to the grounded primary shield while a very small remainder of the highly charged spray particles deposit on the portion of the workpiece surface facing the primary shield to form the third coating portion of the band of coating applied to said elongated area. The spray particles that deposit to form the third coating portion are also deflected from their direction of movement toward the workpiece surface by their relative proximity to the grounded primary shield 58 by different amounts depending on the particle charge, the particle speed and the distance between the particle and the grounded primary shield. Therefore, there is a gradual change in intensity between the second coating portion and the third coating portion. In the absence of a ground for the primary shield, the third coating portion would be widely dispersed over the surface portion of the workpiece that is desired to be free of coating.

For reasons just explained, the primary grounded shield delineates a narrow third coating portion of finite width that forms a boundary zone of sparce intensity adjacent a barely perceptible cut-off line between the clear and the coated portion of the workpiece. The change in intensity at the boundary between the second coating portion and the third coating portion is also gradual for reasons similar to those advanced for the gradual change in intensity at the boundary between the first coating portion and the second coating portion. The primary shield also receives on its top surface dye particles or liquid droplets containing dye particles that, in the absence of the primary shield, would tend to agglomerate in larger sizes and then deposit on the upper surface of the workpiece to spoil its optical properties so that it cannot be used as an interlayer.

The manifold 60, when included between the primary and secondary shields, provides a bed of pressurized air between the shields in a direction toward the lateral outboard edges of the shields. This widens the region of gradual change of spray intensity forming the second coating portion of the elongated area. In case a manifold is included in the apparatus, the primary shield also receives on its top surface any dye particles or liquid droplets containing dye particles that would tend to deposit on the manifold and, when accumulated to a sufficient extent, in the event the apparatus does not include a primary shield, would form a line of color on the workpiece surface conforming to the longitudinal shape and location of the manifold. A deflector may be incorporated with the manifold to direct the flow of pressurized fluid along a desired path to further improve the control of the coating pattern.

An important auxiliary factor of the present apparatus involves heating a portion, preferably the inboard edge portion of at least the primary shield. Heating the edge portion of the primary shield causes the liquid component of the droplets that deposit on the edge portions of the primary shield to evaporate. Evaporation of the droplets reduces the tendency of the droplets to coalesce and then form a line of dye on the workpiece aligned with the curved edge of the primary shield.

A heater on the curved edge portion of the primary shield evaporates the solvent of the dye composition from its lower surface, reducing the tendency for droplets of underspray attracted to the lower surface of the primary shield to deposit on the workpiece. The highly charged electrostatic spray particles that remain after the liquid component evaporates are attracted to the grounded primary shield instead of the workpiece.

The secondary shield 62 together with its thin layer 56 are also heated, particularly when production requires frequent intermittent operation of the electrostatic spray guns. Heating the secondary shield and its covering layer 56 evaporates the solvent from the wet droplets deposited on the upper surface of layer 56, preferably before a succeeding spray is applied, part of which is intercepted by the upper surface of the secondary shield. The dried dye particles that remain are highly charged and electrically attracted to the cover layer 56 of the grounded secondary shield. Once the liquid component is evaporated, the dye particles become chemically bound to the covering layer 56 and no liquid film remains on the cover layer 56. When additional spray applied along an axis oblique to the upper surface is intercepted by the cover layer of the secondary shield, there is no liquid film accumulated from a previous deposit to splash on the upper surface of the workpiece.

Heating the marginal portions of the grounded shields 58 and 62 to a slightly elevated temperature in the vicinity of the boundary or cut-off line of the shade band area facilitates limited volatilization of the volatiles in the spray composition and reduces the tendency of mottle to form in the shade band area. At the same time, the amount of volatilization is limited to avoid the appearance of undissolved particles of dye in the shade band.

The spray guns 71L and 71R are disposed to one side of the elongated area to be provided with a shade band when the workpiece W is pivoted while supported by vacuum on the vacuum platen 14 in an oblique plane at the coating chamber 35. Hence, drops of spray composition are not likely to drip onto the exposed surface area of the workpiece W.

The pivoting of the vacuum platen 14 enables the latter to be oriented horizontally at the loading and unloading chamber 22. In this position, with no vacuum applied, it is easy to install a flexible workpiece on the apertured upper wall 18 of the vacuum platen 14 in unwrinkled condition or to remove the workpiece after the flexible workpiece has been sprayed. Vacuum at a controlled amount of vacuum holds the flexible workpiece against the vacuum platen without wrinkling during transfer in a horizontal plane and pivoting to and spraying while the flexible workpiece is supported in an oblique plane.

The heat lamps at the loading and unloading station provide additional help to evaporate the volatile component of the spray composition. The coated workpieces can then be subjected to further treatment, such as the application of an antenna wire, immediately after the coating is completed. A suitable parting material is applied between adjacent workpieces, which are then stored under controlled temperature and humidity conditions (preferably about 68° F. or 20° C. and a maximum of 20% relative humidity) until the workpieces are assembled, prepressed and laminated to one or more glass sheets or rigid transparent sheets of plastic such as polycarbonate and acrylic plastic bent to the desired shape and provided with a desired outline under conditions well known in the art.

The close spacing of the primary shield to the surface of the workpiece to be coated insures adequate control of the position of the cut-off line between the coated and uncoated portions of the workpiece. When the spacing exceeds 5 millimeters, this control becomes lost with increased spacing. However, care must be taken to avoid having the primary shield contact the workpiece or to be spaced less than one millimeter from the workpiece surface. In case of contact or too close spacing, the cut-off line between coated and uncoated portions becomes too sharp and a line of optical illusion becomes apparent in the clear portion of the workpiece. Avoidance of this line of optical illusion can be accomplished by a spacing of 1 to 5 millimeters between the primary shield and the surface of the workpiece while retaining adequate control of the location of the cut-off line. Such close spacing makes it impractical to insert a manifold between the primary shield and the workpiece. Therefore, if a complicated pattern of coating gradation is desired such as to necessitate a secondary shield, a manifold is placed between the primary and secondary shields as disclosed in this description of the preferred embodiment.

The form of the invention shown and described in this disclosure represents an illustrative preferred embodiment thereof. It is understood that various changes may be made without departing from the gist of the invention as defined in the claimed subject matter that follows.

We claim:

1. A method of applying an elongated shade band to an elongated area of a flexible sheet of interlayer material suitable for use as an interlayer in a laminated windshield comprising supporting a clear sheet of interlayer material in a given plane;

applying an electrostatic spray of a dye composition from an electrostatic spray gun toward a surface of said sheet about an axis of spray oblique to said plane over a distance d;

interposing a pair of grounded shields of electroconductive material having longitudinally extending curved outboard lateral edges of corresponding configuration between said electrostatic spray gun and said surface of said sheet, one of said shields being spaced from said surface of said sheet by a distance from 1 to 5 millimeters and being located in the shadow of the other of said shields with respect to the electrostatic spray applied by said electrostatic spray gun, the other of said shields being spaced at least 5 millimeters from said one shield in a direction away from said surface of said sheet and being spaced from said electrostatic spray gun at least 90% of said distance d, whereby when said electrostatic spray of highly charged, finely divided particles of a dye composition is applied toward said surface of said sheet, a portion of said spray deposits on said surface to form a first coating portion of substantially uniform, maximum intensity, particles of said spray pass adjacent to the laterally outboard edge of said other shield to form an underspray of highly charged particles, part of said underspray is attracted by said grounded shields, part of said underspray deposits on said sheet surface to form a second coating portion of graded intensity adjacent said first coating portion, and part of said underspray passes adjacent the laterally outboard edge of said one shield to form a very fine underspray portion beneath said one shield, part of said very fine underspray portion deposits on said sheet surface to form a third coating portion adjacent said second coating portion, the boundary portions between said adjacent coating portions being more gradual than adjacent coating portions produced by applying coating compositions past a plurality of shields that serve as mechanical barriers only to the direct flow of coating composition.

2. A method as in claim 1, wherein said electrostatic spray gun applies a dye composition comprising highly charged dye particles in a volatile liquid vehicle further comprising heating at least the laterally outboard edge of said one shield to a temperature between 120° F. (49° C.) and 170° F. (77° C.) to help volatilize said liquid vehicle applied to said sheet surface.

3. A method as in claim 2, further including heating at least a portion of said other shield to a temperature between 120° F. (49° C.) and 170° F. (77° C.) to help further volatilize said liquid vehicle.

4. A method as in claim 1, for use in forming a graded coating having a curved cut-off line onto said sheet comprising interposing said shields with said curved laterally outboard edges conforming in shape to said cut-off line in the path of said electrostatic spray.

5. A method as in claim 4, further comprising applying a pressurized bed of fluid non-reactive with said spray from a curved manifold spaced a uniform distance from said curved edges in a direction toward said curved edges and between said shields.

6. A method as in claim 1, wherein said electrostatic spray gun is reciprocated past said surface of said sheet and is operated only while said gun is passing in facing relation to an elongated area of said sheet desired to be coated.

7. A method as in claim 6, wherein a plurality of electrostatic sprays is applied, each spray being applied from a reciprocating spray gun only when the latter passes in facing relation to said elongated area.

* * * * *